Figures 1, 2:
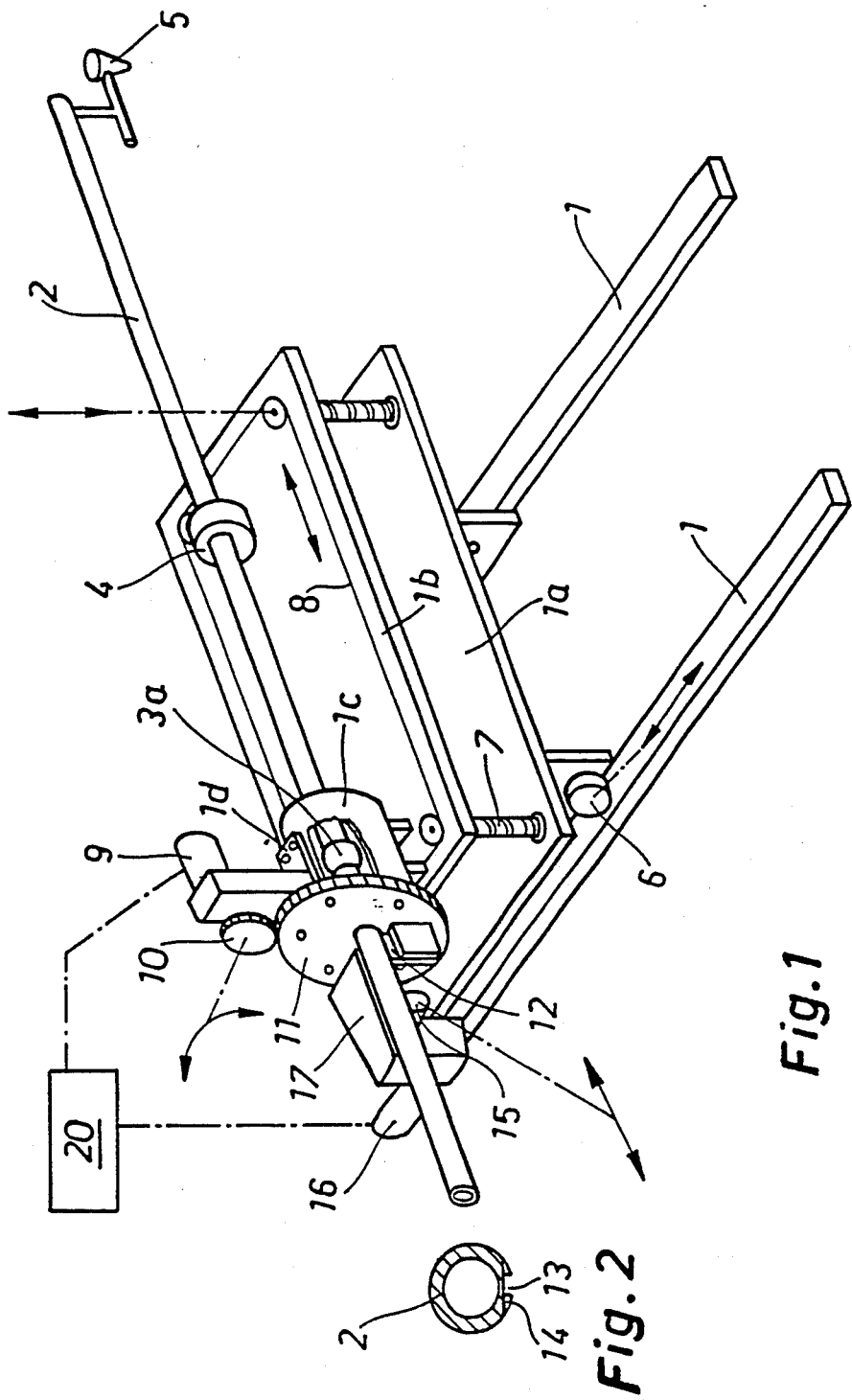

United States Patent [19]

Larikka

[11] Patent Number: 4,717,124
[45] Date of Patent: Jan. 5, 1988

[54] STEERING MECHANISM FOR AUTOGENOUS CUTTING TORCH

[76] Inventor: Leo Larikka, Takkatie 7 a, 00370 Helsinki, Finland

[21] Appl. No.: 897,756
[22] PCT Filed: Jan. 7, 1986
[86] PCT No.: PCT/FI86/00001
 § 371 Date: Aug. 13, 1986
 § 102(e) Date: Aug. 13, 1986
[87] PCT Pub. No.: WO86/04003
 PCT Pub. Date: Jul. 17, 1986

[30] Foreign Application Priority Data

Jan. 7, 1985 [FI] Finland ............... 850057

[51] Int. Cl.⁴ ............... B23K 7/02
[52] U.S. Cl. ............... 266/54; 266/72; 266/48
[58] Field of Search ............... 266/48, 54, 70, 73, 266/77, 35, 56, 51, 72

[56] References Cited

U.S. PATENT DOCUMENTS

| | | | |
|---|---|---|---|
| 2,202,131 | 5/1940 | Wagner | 266/70 |
| 4,330,110 | 5/1982 | Creech | 266/70 |
| 4,372,538 | 2/1983 | Balfanz | 266/70 |
| 4,411,410 | 10/1983 | Sumner | 266/54 |
| 4,455,015 | 6/1984 | Larikka | 266/54 |

Primary Examiner—Melvyn J. Andrews
Assistant Examiner—S. Kastler
Attorney, Agent, or Firm—Mason, Kolehmainen, Rathburn & Wyss

[57] ABSTRACT

The invention relates to a steering mechanism for an autogenous cutting torch, wherein an autogenous cutting torch (5) is fastened to the end of a steering arm (2) shaped as a long shaft. Steering arm (2) is adapted to be axially movable and rotatable around its axis. In order to control the movements digitally at a desired, readily variable ratio of dependence or alternatively in cycles of desired duration, digitally controlled motors are operated, the first motor (9) rotating a gear (11) surrounding said steering arm (2). This gear (11) drives steering arm (2) therealong but steering arm (2) is axially movable relative to gear (11). Said gear (11) is fitted with a second digitally controlled motor (16), a gear (15) driven thereby being meshed with a toothed rack (2, 14) provided by the steering arm itself, for producing said axial movement.

7 Claims, 3 Drawing Figures

STEERING MECHANISM FOR AUTOGENOUS CUTTING TORCH

The present invention relates to a steering mechanism for an autogenous cutting torch, comprising a base, a steering arm in the form of a long shaft, whose one end is fitted with an autogenous cutting torch, said steering arm being journalled to be axially movable relative to the base and rotatable around its axis, and control and drive means for said steering arm both for moving the steering arm axially and for rotating it around its axis, the drive means for achieving the axial movement of said steering arm being fastened to an element rotating along with the steering arm which is axially movable through said element, said integrally rotating element being a transmission means between a drive means for producing the steering arm rotating motion and the actual steering arm.

This type of mechanism is disclosed in Patent publication SE-422 169. In this prior known mechanism, the control of a steering arm's axial movement is based on monitoring the surface of a workpiece by means of a sensor while the rotation of a steering arm is effected at some predetermined, e.g. constant speed. Thus, the axial movement of a steering arm follows in a forced manner the surface configuration of a workpiece in the travelling path of a cutting torch as said torch is advancing as a result of the steering arm's rotation. This prior known mechanism is only capable of working surfaces which have a projection in the plane perpendicular to the axial direction of a steering arm. Working of a cylindrical surface or a pipe from inside is not possible at all. The cutting pattern will be limited to a pattern formed by a cutting line between a cylindrical surface concentric with the steering arm and a workpiece surface being machined. In other words, the mechanism can be used for cutting not only circular holes but also elliptical holes by placing a cylindrical body to be machined in an inclined position relative to the axial direction of a steering arm. Despite the complicated design of such a mechanism, its plausible applications are quite limited.

The Applicant's U.S. Pat. No. 4,455,015 discloses an apparatus for cutting circular or elliptical holes in cylinders and pipes from the inside. In this prior known apparatus, the dependence between the rotary movement and axial movement of a steering arm is obtained by means of a link mechanism and thus a cutting pattern can only be changed by changing the leverages. Also, adaptation of the apparatus to the working of surfaces of various shapes requires accurate and tedious setting work. A particular restriction is that the apparatus cannot be used for cutting a pipe.

An object of the invention is to develop the abovementioned apparatus further so that its adaptability and scope of application will be substantially more extensive than heretofore while, at the same time, a desired cutting pattern can be readily selected by means of digital control. A further object of the invention is to improve said apparatus in a manner that its adaptation to the working of surfaces and workpieces of various shapes, combined with a possibility of selecting a desired cutting pattern, can be done by way of programming without re-arranging mechanical components.

These objects will be achieved on the basis of inventive features set forth in the annexed claims One embodiment of the invention will now be described in more detail with reference made to the accompanying drawings, in which FIG. 1 is a perspective view of a steering mechanism of the invention and FIG. 2 shows the steering arm of such mechanism in cross-section.

Figure 3:
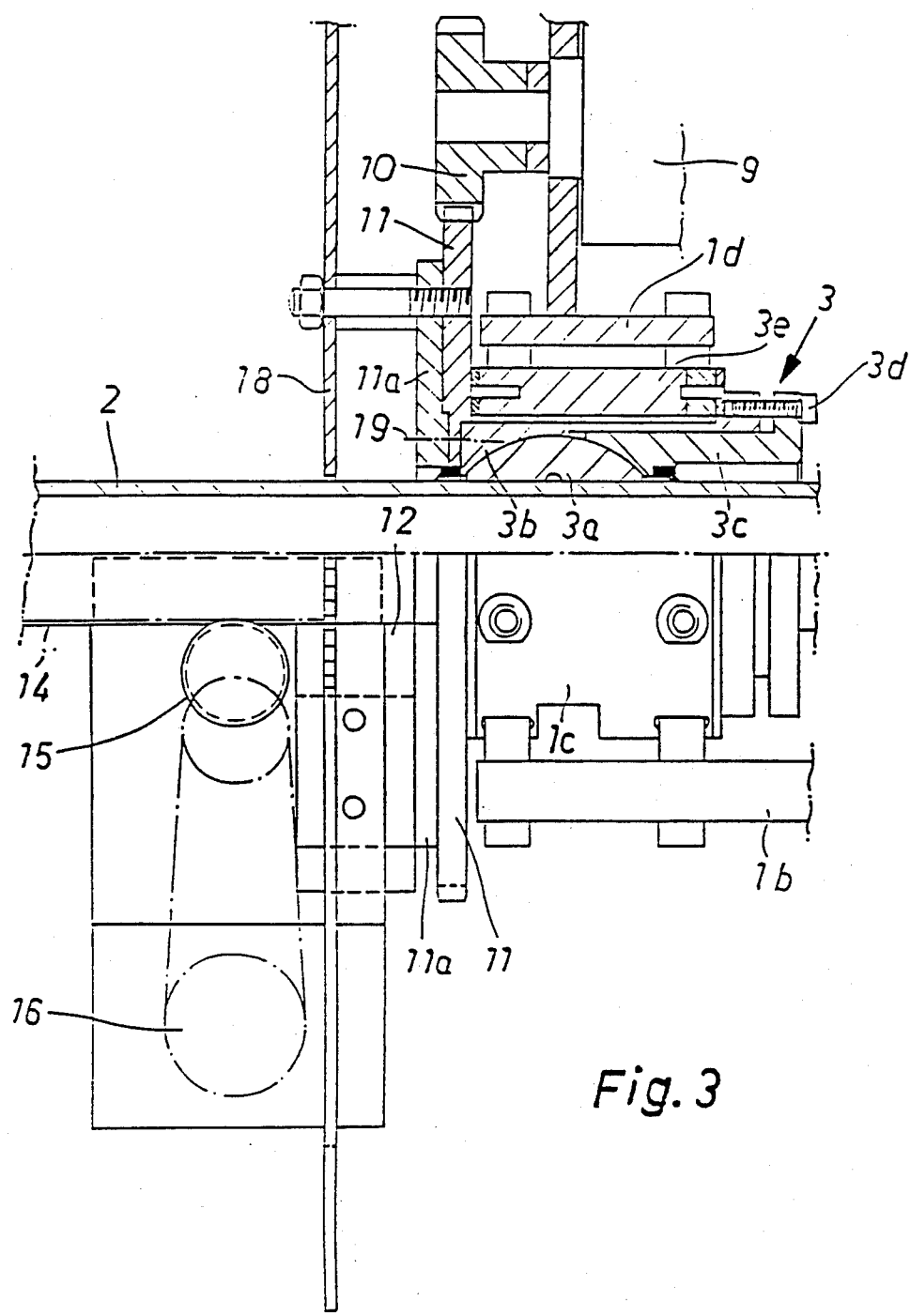

FIG. 3 shows an essential detail of the mechanism to a larger scale, the portion above the centre axis showing an axial section.

Supported on base runners 1 is a base section 1a, which is movable on wheels 6 and carries a base section 1b. Base section 1b provides a bed for other control equipment and is mounted on base section 1a by means of so-called vertical adjustment screws 7. A cable, chain or similar drive 8 can be used to rotate screws 7 for adjusting the height of bed 1b. Said bed 1b carries a cylindrical base section 1c fitted with an internal bearing 3 for supporting a steering arm 2. Bed 1b carries also another bearing 4, through which said steering arm 2 extends. The steering arm 2 comprises a long shaft, preferably a hollow tube and is rotatable on bearings 3 and 4 as well as slideable in axial direction. The free end of steering arm 2 is fitted with an autogenous cutting storch 5.

Base section 1c is provided with a controllable motor 9, e.g. a repeater or direct-current motor. Motor 9 drives a gear 10 which is meshed with the tooth rim of a gear 11. Gear 11 is mounted by means of bearing 3 on the base, as shown in FIG. 3. The screws, shown at 19 and spaced along the rim surrounding shaft 2, serve to fasten gear 11 to a bearing section 3b. This bearing section is in turn fastened with screws 3d to the other bearing half 3c. The surfaces of a base-adjoining bearing section 3e are coated with a suitable slide bearing material. Thus, the bearing sections 3b and 3e provide together a slide bearing allowing the rotation of bearing section 3b. This is how gear 11 is rotatably journalled to the base. In order that the possible deflections of steering arm 2 would not prevent the axial movement of said steering arm 2 through bearing 3, the interior of bearing sections 3b and 3c is fitted with a bearing bush 3a whose outer surface forms a spherical bearing for accommodating the possible deflections of steering arm 2 as it passes through bearing 3. Thus, said steering arm 2 slides in axial direction against the inner surface of bearing section 3a.

Mounted on gear 11 is a fin 12 whose edge is in sliding engagement in a groove 13 extending lengthwise of steering arm 2 (FIG. 2). As gear 11 rotates, said steering arm 2 rotates therewith. At the same time, however, steering arm 2 is able to move axially.

For the axial movement of steering arm 2 there is provided another controllable motor 16 which may also be a repeater or direct-current motor. Motor 16 is fastened to gear 11 so as to follow the rotating motion of steering arm 2. In FIG. 1 the fastening is effected by means of a separate clamping plate 17 but the fastening can also be effected by means of fin 12 which, in the case shown in FIG. 3, is connected to gear 11 by using a separate clamping plate 11a. In order to achieve as long an axial movement as possible with optimum space utilization, said gear 11 and drive means 15, 16 are mounted on steering arm 2 on the side of steering arm support bearings 3, 4 opposite to autogenous cutting torch 5.

Motor 16 drives a gear 15 which is meshed with the teeth 14 of steering arm 2. Thus, the steering arm 2 itself is designed as a toothed rack for axial displacement thereof. The length of teeth 14 is selected to represent the longest desirable axial movement of autogeneous cutting torch 5. As shown in FIG. 2, the toothed rack is formed inside the steering arm envelope surface for allowing the steering arm together with its toothed rack to slide through bearings 3, 4 provided with cylindrical slide bearing surfaces.

Motors 9 and 16 receive their control from a control unit 20 fitted with a microprocessor, programmable by means of digital keys for pre-programming it in a manner that by tapping a certain combination of numbers said motors 9 and 1 can be brought to perform a desired movement either independently of or dependently on each other. When the motors are driven independently of each other, the rotational and axial movement can be effected alternately in cycles of desired duration. Thus, it will be possible to cut circular or polygonal pipes perpendicularly, stepwise or with a desired angle. For example, an autogenous cutting torch 5 can be used to make a hole of arbitrary shape in a cylindrical surface. The only limitation regarding the shape of workpieces and cutting patterns is the programming and performance of a microprocessor included in control unit 20. It is obvious that with modern microprocessor technology it will be possible to meet all practical control requirements.

When proceeding to cut planar surfaces, all that must be done is to stop motor 9 in a certain position followed by coupling on the drive of wheels 6. The lateral movement on runners 1 can in turn be made arbitrarily dependent on the control of motor 16. Thus, it will be possible to make arbitrary cutting patterns in a planar sheet as well. When the question is about a vertical planar surface, e.g. the vertical side of a square pipe, motor 9 is driven to turn autogenous cutting torch 5 into a horizontal position, the mechanism is carried on runners 1 to a location where autogenous cutting torch 5 lies at a suitable working distance from the surface of a workpiece and vertical adjustment means 7, 8 are used to displace autogenous cutting torch 5 in vertical direction. Motor 16 can be driven to combine a horizontal movement into said vertical movement for an inclined cutting in a vertical surface. Alternating drive can be used to obtain a stepped cutting pattern.

It is clear that the invention is not limited to the above embodiment but contructional details can be modified in many ways within the scope of the annexed claims.

I claim:

1. A steering mechanism for an autogenous cutting torch, comprising:
   a base;
   a steering arm comprising an elongated shaft having one end supporting said torch;
   means for supporting said steering arm on said base for movement along a longitudinal axis of said arm and for rotary movement around said axis;
   drive means for moving said arm along said axis and for rotating said arm around said axis, said drive means including a rotary power source drivingly connected to a rotatable drive element around said shaft, which shaft is extended through said drive element and drivingly engaged therewith so that said shaft is rotated with said drive element;
   digital control means for activating said drive means to rotate said shaft and to move said shaft longitudinally along said axis during rotation or alternatively in cycles of desired duration of rotation and longitudinal movement;
   said drive means including an elongated toothed rack mounted within a cylindrical surface of said steering arm for moving said arm along said longitudinal axis; and
   a slide bearing for supporting said arm on said base for movement along said longitudinal axis, said arm passing through said slide bearing and extending outwardly from opposite sides thereof a substantial distance during all operating conditions of said arm.

2. A steering mechanism as set forth in claim 1, wherein:
   said drive element rotating along with said steering arm comprises a gear concentrically surrounding said steering arm and fastened to a bearing section rotating between said steering arm surrounding slide bearing and said base, wherein a tooth rim of said gear is meshed with a pinion gear driven by a first digitally controlled motor of said rotary power source, said steering arm surrounding gear being fitted with a second digitally controlled motor and a second gear driven thereby being meshed with said toothed rack on said steering arm itself, and wherein said steering arm surrounding gear is fitted with a steering fin which is in sliding engagement in a groove extending lengthwise of the steering arm.

3. A steering mechanism as set forth in claim 1 wherein:
   said drive element rotating along with said steering arm and said drive means for producing axial movement of said steering arm are mounted on said steering arm on a side opposite to said steering arm slide bearings relative to said autogenous cutting torch.

4. A steering mechanism as set forth in claim 1, wherein:
   an outer surface of said steering arm supporting slide bearing is spherical and said bearing section surrounding said slide bearing and rotatable relative to the base is fastened to said steering arm surrounding gear.

5. A steering mechanism as set forth in claim 1, wherein:
   said steering arm comprises a hollow tube.

6. A steering mechanism for an autogenous cutting torch, comprising:
   a base;
   a steering arm comprising an elongated shaft having one end supporting said torch;
   means for supporting said steering arm on said base for movement along a longitudinal axis of said arm and for rotary movement around said axis;
   drive means for moving said arm along said axis and for rotating said arm around said axis, said drive means including a rotary power source drivingly connected to a rotatable drive element around said shaft, which shaft is extended through said drive element and drivingly engaged therewith so that said shaft is rotated with said drive element;
   digital control means for activating said drive means to rotate said shaft and to move said shaft longitudinally along said axis during rotation or alternatively in cycles of desired duration of rotation and longitudinal movement; and said base including a first member for supporting said steering arm and said drive means, a second member for supporting said first member at an adjustable height relative to said first member, and a third member comprising runners transverse to said cross arm and supporting said second member for relative movement of said steering arm in a direction transverse to said steering arm.

7. A method of operating a steering mechanism carrying an autogenous cutting torch for cutting an elongated hollow tubular workpiece, said mechanism of the type comprising a base, a steering arm including an elongated shaft having one end supporting said torch, means for supporting said steering arm on said base for movement along a longitudinal axis of said arm and for rotary movement around said axis, drive means for moving said arm along said axis and for rotating said arm around said axis, said drive means including a rotary power source drivingly connected to a rotatable drive element around said shaft, which shaft is extended through said drive element and drivingly engaged therewith so that said shaft is rotated with said drive element, digital control means for activating said drive means to rotate said shaft and to move said shaft longitudinally along said axis during rotation or alternatively in cycles of desired duration of rotation and longitudinal movement, said drive means including an elongated toothed rack mounted within a cylindrical surface of said steering arm for moving said arm along said longitudinal axis, and a slide bearing for supporting said arm on said base for movement along said longitudinal axis, said arm passing through said slide bearing and extending outwardly from opposite sides thereof a substantial distance during all operating conditions of said arm;

said method comprising the steps of:

aligning said steering arm in parallel with a central longitudinal axis of said hollow tubular workpiece; and maintaining said steering arm in parallel with said longitudinal axis of said workpiece during working movement of said steering arm along said longitudinal axis.

* * * * *